United States Patent
Tu

(10) Patent No.: US 7,289,288 B1
(45) Date of Patent: Oct. 30, 2007

(54) DISK DRIVE HAVING HYBRID SPINDLE SPEED CONTROL AND RELATED METHOD

(75) Inventor: Kuang-Yang Tu, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/387,429

(22) Filed: Mar. 23, 2006

(51) Int. Cl.
G11B 15/46 (2006.01)
G11B 5/596 (2006.01)
G05B 11/01 (2006.01)

(52) U.S. Cl. .............. 360/73.03; 360/78.04; 360/77.02; 318/109; 318/560

(58) Field of Classification Search ........... None
See application file for complete search history.

(56) References Cited

U.S. PATENT DOCUMENTS

| 5,038,232 | A | 8/1991 | Grace |
| 5,218,491 | A | 6/1993 | Nishida et al. |
| 6,021,012 | A | 2/2000 | Bang |
| 6,067,202 | A | 5/2000 | Rowan et al. |
| 6,094,020 | A * | 7/2000 | Goretzki et al. ............ 318/109 |
| 6,175,458 | B1 | 1/2001 | Carlson |
| 6,710,957 | B2 | 3/2004 | Nakasato |
| 6,754,025 | B1 | 6/2004 | Shepherd et al. |
| 6,839,194 | B2 | 1/2005 | Koyanagi |
| 6,914,740 | B1 | 7/2005 | Tu et al. |
| 6,954,324 | B1 * | 10/2005 | Tu et al. ................. 360/73.03 |
| 7,133,243 | B2 | 11/2006 | Hirano et al. |
| 7,212,374 | B1 | 5/2007 | Wang et al. |
| 2004/0245950 | A1 | 12/2004 | Ang et al. |

FOREIGN PATENT DOCUMENTS

JP 2-73568 3/1990

* cited by examiner

*Primary Examiner*—Andrew L. Sniezek
(74) *Attorney, Agent, or Firm*—Jonathan E. Prejean, Esq.; Robroy R. Fawcett, Esq.

(57) ABSTRACT

A disk drive is disclosed having hybrid spindle speed control. The disk drive includes a disk having a plurality of servo wedges, and a spindle motor for rotating the disk at an operating speed. The spindle motor generates a back electromotive force (BEMF) voltage. In operation, the disk rotation is maintained at the operating speed during a track following operation by updating, in a wedge spindle speed control mode, the spindle control current in response to a wedge speed error. Before executing a high-speed seek, the disk drive is switched to a BEMF spindle speed control mode, and the disk rotation is maintained at the operating speed during the high speed seek by updating the spindle control current in response to a BEMF speed error signal generated based on the BEMF voltage. During a seek-settle time, the disk drive is switched back to the wedge spindle speed control mode.

4 Claims, 3 Drawing Sheets

DISK DRIVE HAVING HYBRID SPINDLE SPEED CONTROL AND RELATED METHOD

BACKGROUND OF THE INVENTION

1. Field of the Invention

The present invention relates to rotating magnetic disk drives, and more particularly, to a disk drive having a hybrid spindle speed control system for maintaining disk rotation speed during a high-speed seek.

2. Description of the Prior Art and Related Information

In order to remain competitive, disk drive manufacturers must continually provide increased data storage capacity and access rate while rigidly controlling disk drive manufacturing cost. One key to increased access rate is increased disk rotation speed. The disk is rotated at a constant angular velocity by a spindle motor in response to a spindle control current. The spindle motor current may be generated based on a measured time between servo wedges on the disk. However, measuring the time between servo wedges may be problematic during a high-speed seek.

Accordingly, there exists a need for a technique for robustly maintaining a disk rotation rate during a high-speed seek.

SUMMARY OF THE INVENTION

The present invention may be embodied in a method for operating a disk drive to maintain a disk rotation speed during track following operations and during high-speed seeks. The disk drive may include a disk, a head actuated over the disk, and a spindle motor. The spindle motor rotates the disk at an operating speed in response to a spindle control current, and has a plurality of windings which generate a back electromotive force (BEMF) voltage. The disk drive further includes a BEMF detector for generating a BEMF signal based on the BEMF voltage. The disk has a plurality of tracks. Each track includes a plurality of data sectors and a plurality of servo wedges. In the method, the disk rotation is maintained at the operating speed during a track following operation by updating, in a wedge spindle speed control mode, the spindle control current in response to a wedge speed error determined based on a wedge-to-wedge time between the servo wedges. Before executing a high-speed seek, the disk drive is switched to a BEMF spindle speed control mode. In the BEMF spindle speed control mode, the disk rotation is maintained at the operating speed by updating the spindle control current in response to a BEMF speed error generated based on the BEMF signal during the high-speed seek. During a seek-settle time, the disk drive is switched back to the wedge spindle speed control mode.

In a more detailed feature of the invention, a high-speed seek may comprise a seek traversing more than two percent (2%) of the tracks.

The present invention also may be embodied in a disk drive that further includes a disk controller. The disk controller may maintain the disk rotation at the operating speed by switching between the wedge spindle speed control mode during track following operations and the BEMF spindle speed control mode during high-speed seeks.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
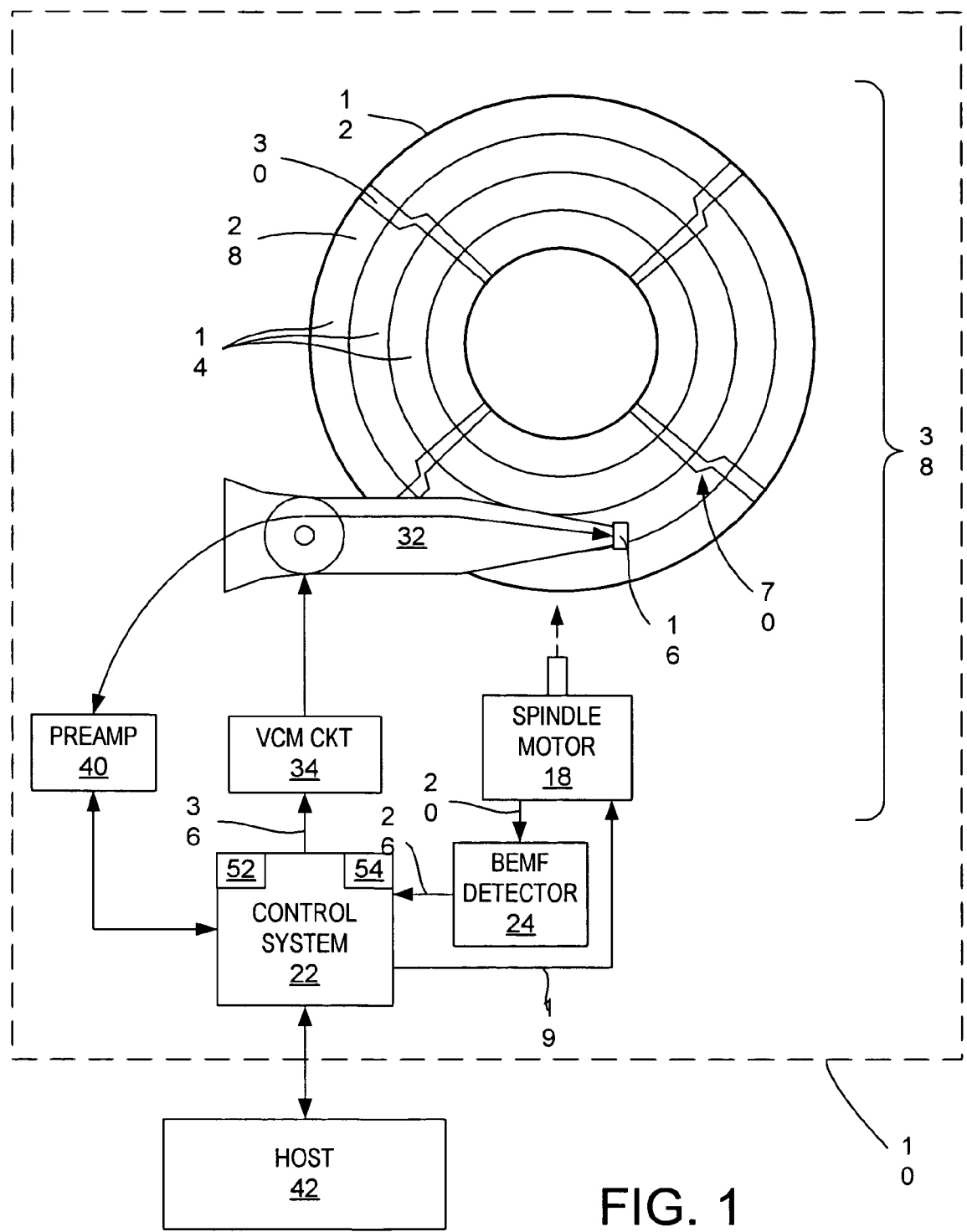
FIG. 1 is a block diagram of a disk drive having hybrid spindle speed control, according to the present invention.
Figure 2:
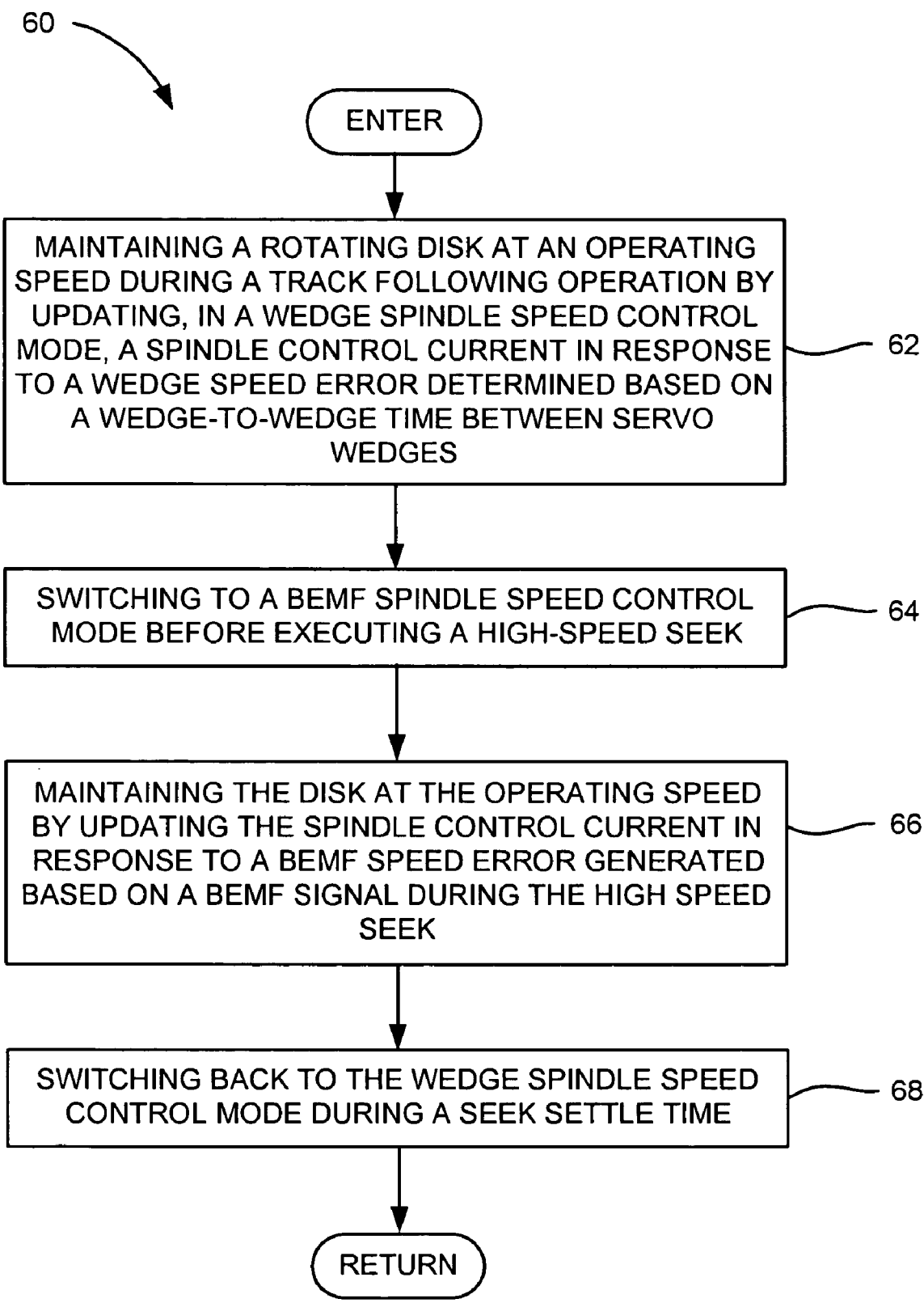
FIG. 2 is a flow diagram illustrating a method for operating a disk drive to maintain a rotating disk at an operating speed during a high-speed seek, according to the present invention.
Figure 3:
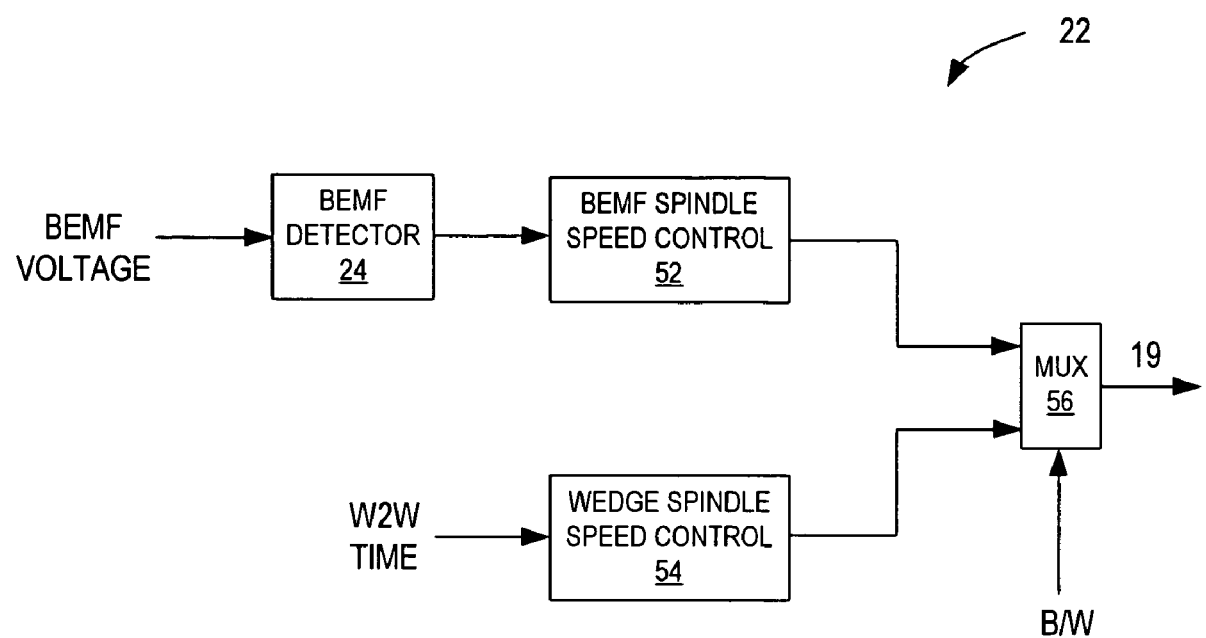
FIG. 3 is a block diagram of a hybrid spindle speed control system, implemented by a disk controller of the disk drive of FIG. 1, for switching between the wedge spindle speed control mode during track following operations and the BEMF spindle speed control mode during high-speed seeks.

With reference to FIGS. 1 to 3, the present invention may be embodied in a disk drive 10 (FIG. 1) having hybrid spindle speed control. The disk drive includes a disk 12 having a plurality of tracks 14, a head 16 actuated over the disk, and a spindle motor 18 for rotating the disk at an operating speed in response to a spindle control current 19. The spindle motor has a plurality of windings (not shown) which generate a back electromotive force (BEMF) voltage 20. The disk drive also includes a disk controller of a control system 22, and a BEMF detector 24 for generating a BEMF signal 26 based on the BEMF voltage. Each track 14 includes a plurality of data sectors 28 and a plurality of servo wedges 30. In a method 60 (FIG. 2) for operating the disk drive, the disk controller maintains the disk at the operating speed during a track following operation by updating, in a wedge spindle speed control mode, the spindle control current in response to a wedge speed error determined based on a wedge-to-wedge (W2W) time between the servo wedges (step 62). The disk controller switches to a BEMF spindle speed control mode before executing a high-speed seek (step 64), and then maintains the disk at the operating speed during the high speed seek by updating the spindle control current in response to a BEMF speed error generated based on the BEMF signal (step 66). During a seek settle time, the disk controller switches back to the wedge spindle speed control mode (step 68).

Advantageously, the disk controller may maintain the disk rotation at the operating speed by switching between the wedge spindle speed control mode during track following operations and the BEMF spindle speed control mode for high-speed seeks. Switching to the BEMF spindle speed control mode for high-speed seeks avoids spindle speed control issues encountered due to head slip, poorly written servo sectors or wedges, or wedge-to-wedge time shift zones 70 that may exist on the disk 12.

The transducer head 16 in present disk drives 10 comprises a giant magneto-resistive (GMR) read element and thin film inductive write element. An actuator is typically implemented as a voice coil motor (VCM) circuit 34 which rotates an actuator arm 32 about a pivot in order to position the head radially over the disk in response to the control signals 36 from the disk control system 22. The VCM circuit, the disk 12, the actuator, the head 16, and the spindle motor 18 may be part of a head-disk assembly (HDA) 38 that also includes a preamplifier 40. The head communicates with the control system via the preamplifier.

The control system 22 also includes circuitry and processors that provide an intelligent disk control system interface between a host 42 and the HDA 38 for execution of read and write commands. The control system may have, for example, an internal microprocessor and nonvolatile memory. Program code for implementing the techniques and control functions of the invention may be stored in the nonvolatile memory and transferred to volatile random access memory (RAM) for execution by the microprocessor.

With particular reference to FIG. 3, the disk controller of the control system 22 implements the BEMF spindle speed control 52 and the wedge spindle speed control 54, which may run simultaneously, with only one selected at a time. A multiplexer 56 selects the BEMF spindle speed control mode or the wedge spindle speed control mode based on a BEMF/wedge (B/W) flag or signal from the disk controller.

Further information and details on exemplary techniques for implementing the BEMF spindle speed control mode and the wedge spindle speed control mode are disclosed in U.S. Pat. No. 6,914,740, titled DISK DRIVE EMPLOYING BEMF SPINDLE SPEED CONTROL OR WEDGE SPINDLE SPEED CONTROL, which patent is incorporated herein by reference.

During a high-speed seek, the head 16 reaches a coast velocity as it traverses the tracks 14 on the disk 12. The coast velocity may depend on the distance the head must travel across the disk from the present track to the target track. The maximum coast velocity may be obtained for a seek traversing more than 1/16 or 1/8 of the tracks on the disk. Advantageously, a high-speed seek may include a seek traversing more than two percent (2%) of the disk's data storage tracks at a coast velocity less than the maximum coast velocity.

I claim:

1. A method for operating a disk drive, the disk drive comprising a disk, a head actuated over the disk, a spindle motor for rotating the disk at an operating speed in response to a spindle control current and having a plurality of windings which generate a back electromotive force (BEMF) voltage, and a BEMF detector for generating a BEMF signal based on the BEMF voltage, wherein the disk has a plurality of tracks, each track including a plurality of data sectors and a plurality of servo wedges, the method comprising the steps of:

maintaining the disk at the operating speed during a track following operation by updating, in a wedge spindle speed control mode, the spindle control current in response to a wedge speed error determined based on a wedge-to-wedge time between the servo wedges;

switching to a BEMF spindle speed control mode before executing a high-speed seek;

maintaining the disk at the operating speed by updating the spindle control current in response to a BEMF speed error generated based on the BEMF signal during the high-speed seek; and switching back to the wedge spindle speed control mode during a seek settle time.

2. A method of operating a disk drive as defined in claim 1, wherein the high-speed seek comprises a seek traversing more than two percent (2%) of the tracks.

3. A disk drive comprising:

a disk having a plurality of tracks, wherein each track includes a plurality of data sectors and a plurality of servo wedges;

a head actuated over the disk;

a spindle motor for rotating the disk at an operating speed in response to a spindle control current, the spindle motor having a plurality of windings which generate a back electromotive force (BEMF) voltage;

a BEMF detector for generating a BEMF signal based on the BEMF voltage; and a disk controller for:

maintaining the disk at the operating speed during a track following operation by updating, in a wedge spindle speed control mode, the spindle control current in response to a wedge speed error determined based on a wedge-to-wedge time between the servo wedges;

switching to a BEMF spindle speed control mode before executing a high-speed seek;

maintaining the disk at the operating speed by updating the spindle control current in response to a BEMF speed error generated based on the BEMF signal during the high-speed seek; and switching back to the wedge spindle speed control mode during a seek settle time.

4. A disk drive as defined in claim 3, wherein the high-speed seek comprises a seek traversing more than two percent (2%) of the tracks.

* * * * *